United States Patent

Perez et al.

[11] Patent Number: 5,112,554
[45] Date of Patent: May 12, 1992

[54] PROCESS OF SEALING A TOP ELEMENT TO A CONTAINER USING HOT MELT MATERIAL

[75] Inventors: Ricardo R. Perez, Naperville; George S. Ulatowski, Thornton, both of Ill.

[73] Assignee: J. L. Prescott Company, South Holland, Ill.

[21] Appl. No.: 599,520

[22] Filed: Oct. 18, 1990

[51] Int. Cl.⁵ .................. B29C 43/18; B32B 1/10
[52] U.S. Cl. ........................... 264/262; 156/69; 156/295; 264/268
[58] Field of Search ............... 264/262, 268; 156/69, 156/295

[56] References Cited

U.S. PATENT DOCUMENTS

| | | | |
|---|---|---|---|
| 2,646,822 | 7/1953 | Ferguson | 156/295 |
| 2,976,200 | 3/1961 | Stover | 156/69 |
| 3,937,641 | 2/1976 | Kushner et al. | 264/262 |
| 3,938,234 | 2/1976 | Price | 156/295 |
| 4,280,864 | 7/1981 | Bromberg | 156/295 |
| 4,519,859 | 5/1985 | Roth et al. | 156/69 |
| 4,694,416 | 9/1987 | Muckenfuhs et al. | 222/109 |
| 4,756,857 | 7/1988 | Dezio et al. | 264/262 |
| 4,870,128 | 9/1989 | Couturier et al. | 524/556 |

Primary Examiner—Jan H. Silbaugh
Assistant Examiner—Brian J. Eastley
Attorney, Agent, or Firm—Lerner, David, Littenberg, Krumholz & Mentlik

[57] ABSTRACT

A top element in the nature of a dripless pour spout is secured to the neck of a liquid container by means of hot melt material to provide a liquid seal therebetween. The hot melt material is applied to the container neck in the form of globs at a plurality of circumferentially spaced locations. Upon application of the top element by rotation thereof, the globs of hot melt material are spread over the container neck to provide a uniform seal thereat.

23 Claims, 3 Drawing Sheets

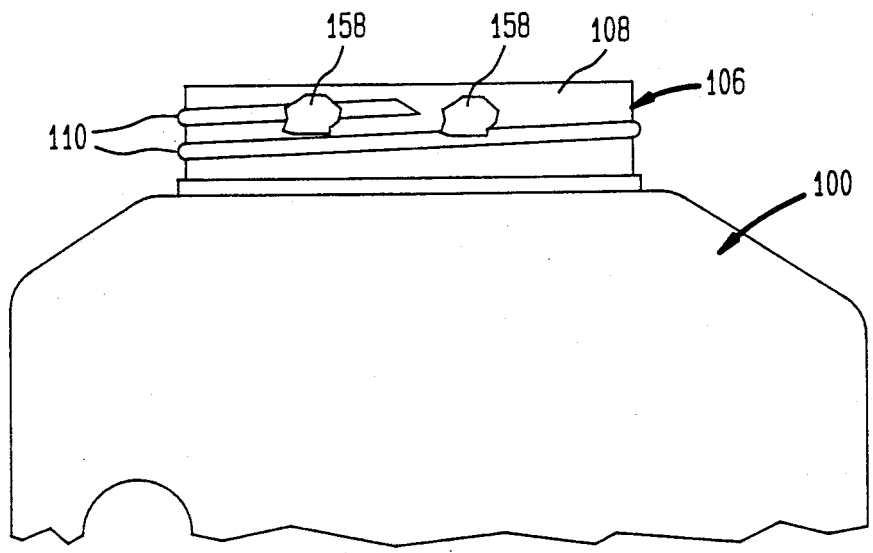
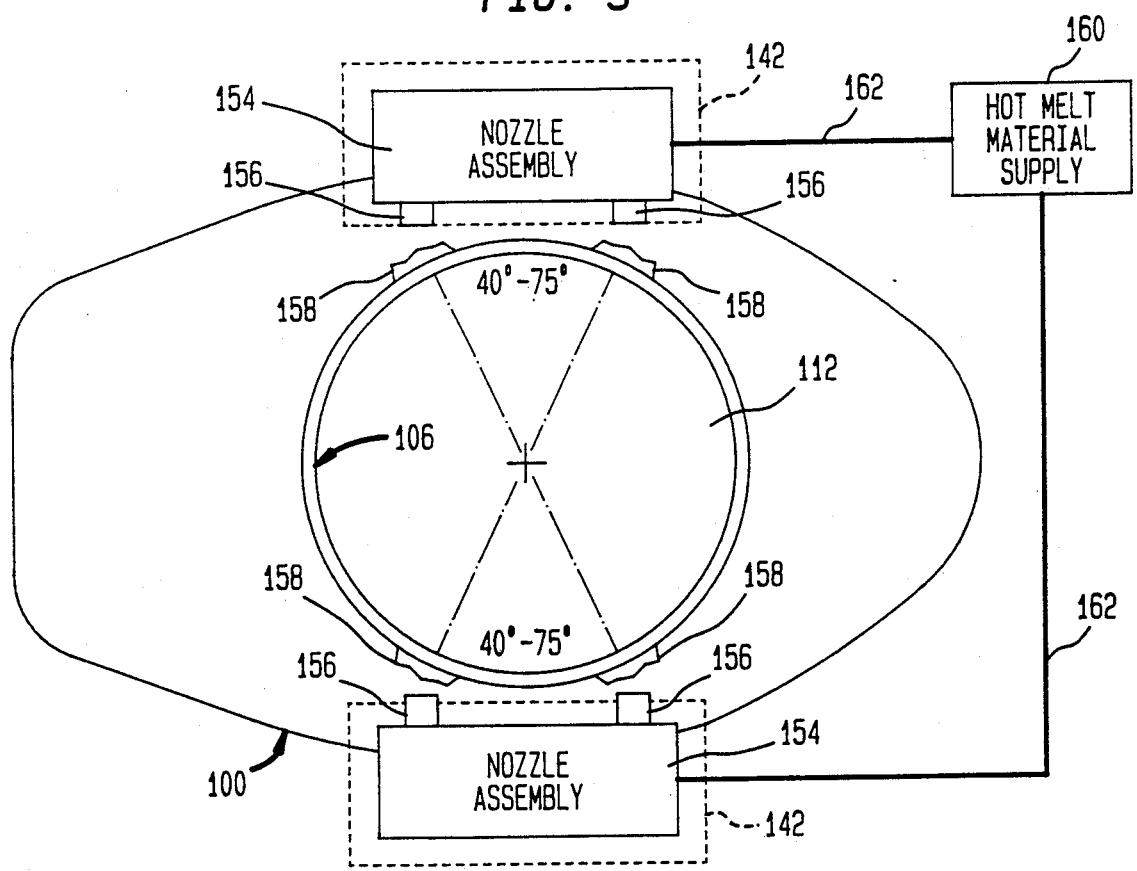

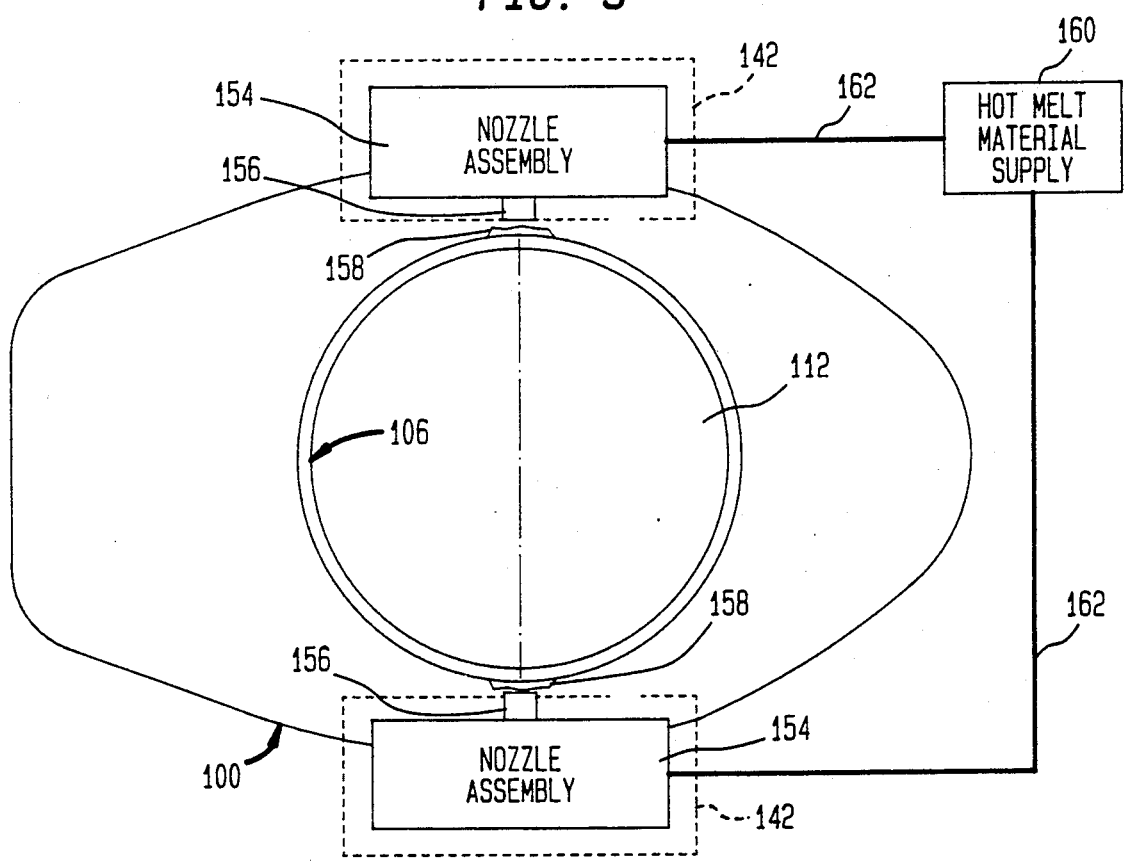

PROCESS OF SEALING A TOP ELEMENT TO A CONTAINER USING HOT MELT MATERIAL

BACKGROUND OF THE INVENTION

The present invention relates in general to new and useful improvements in the sealing of closure-like elements to the neck of containers, and more particularly, to a process of applying a top element to a container using hot melt material to form a liquid seal therebetween.

Containers of various designs for storing and dispensing of liquid materials have achieved large consumer acceptance for a variety of household products. Of particular interest are liquid dispensing containers for household products such as detergents, fabric softeners, synthetic bleaching agents and the like. Certain of these containers have incorporated a measuring cup which also functions as a closure for the container by being securable to a so-called dripless pouring spout. One such liquid dispensing container is known from Muckenfuhs et al., U.S. Pat. No. 4,696,416.

The container of Muckenfuhs et al. includes a collar from which there extends a pouring spout sealingly secured to a dispensing orifice on the container. The collar and pouring spout form a drain back partition with a drainhole to collect and return residual liquid to the container, as well as return of unused liquid from the measuring cup. The collar is formed from material harder than the container such that an annular sealing ring providing on the collar will slightly deform or cut into the softened material of the top surface of the container neck to create a liquid seal thereat. Despite this apparent creation of a liquid seal, it has been found that containers of this construction have a tendency to leak during transport from the container filling station to the consumer. The loss of a liquid seal is further aggravated by the frequent rough handling of these containers during shipment and stocking in warehouses and on shelves of retail establishments.

Hot melt material for use as gaskets and seals in container closures has gained acceptance in the past several years. These hot melt materials traditionally have been based upon either ethylene or vinyl acetate copolymer and/or a styrenic block copolymer. There is known from Couturier et al., U.S. Pat. No. 4,870,128, the forming of a gasket from hot melt material including a copolymer of ethylene and an olefinic carboxylic acid. The gasket is formed by applying the hot melt material in molten flowable form to the inner surface of a closure lid in the shape of a gasket or as a molten lump and then molded into the desired gasket shape with a molding die. These gasketed closure lids are subsequently aged for an extended period, for example, 24 to 48 hours at room temperature, before the closure lid is applied to the container.

The resulting closure lid and gasket combination have been found suitable for use as bottle caps, metal or plastic, large container closures, pail lids, drum lids and the like. Preferably, these gasketed closure lids are disclosed as having utility as carbonated soft drink closures or in food packs, especially those which are pasteurized during processing such as pickles, jellies and jams, and fruit drinks. Although these closure lids having hot melt material formed gaskets are suitable for a variety of containers, the formed gasket requires an aging period or, at the very least allowed sufficient time to solidify from its applied molten state, prior to application to a container to form a conventional compression type seal. These gasketed closure lids are therefore not suitable for creating an instantaneous liquid seal between a closure and container, and particularly, those which do not rely upon the presence of a compressive force with the gasket to achieve the liquid seal.

The application of hot melt material to form a seal between a container and a top element, wherein the seal is subjected to a high top loading of a nature wherein conventional gasket materials such as plastisols will unduly flow and result in leakage is known from Dezio et al., U.S. Pat. No. 4,756,857. Dezio et al. discloses a liquid container having a neck provided with an unthreaded cylindrical portion to which there is secured a top element. Hot melt material is applied by means of an extrusion apparatus in the form of a continuous band having a preselected pattern into an annular recess formed within the top element. The top element is then compressed onto the cylindrical portion such that the hot melt material is extruded around the cylindrical portion to function as a gasket and a support for the top element relative to the container neck. In a variation, the container neck is provided with a threaded cylindrical portion engageable with corresponding threads provided internally within the top element. The hot melt material is applied within the channel of the top element in a similar manner. Upon applying the top element to the container neck by rotation thereof to achieve cooperative threaded engagement, the hot melt material by virtue of the necessity of having to form both a gasket and support is not spread about the threaded cylindrical portion.

During application of the top element to the container neck in Dezio et al., the hot melt material is extruded into an annular region which is in fluid communication with the interior of the container. This results in possible contamination of the container contents by the hot melt material, as well as possible chemical attack of the hot melt material dependent upon the particular liquid stored within the container. In addition, Dezio et al. requires that the hot melt material be applied by means of a complicated extrusion apparatus upon positioning the top element in operative relationship therewith. This necessitates that the top element be subsequently advanced from the extrusion apparatus and manipulated into position for application to the container neck. Accordingly, one can appreciate that there is an unsolved need for providing a process of sealing a top element to a container using hot melt material which overcomes the above disadvantages from the presently known processes.

SUMMARY OF THE INVENTION

An object of the present invention is to provide a process of forming a liquid seal between a top element and a container neck by application of hot melt material thereto in an assembly line production technique.

Another object of the present invention is to provide a process for forming a liquid seal using hot melt material between a top element and a container neck which will maintain its seal during rough handling, such as during transport from the container filling station to the consumer.

Another object of the present invention is to provide a hot melt sealing process for applying top elements to container necks which is inexpensive and reliable.

In accordance with one embodiment of the present invention there is disclosed a method of applying a top element to the neck of a container to provide a seal therebetween, the top element and the neck having cooperating mechanical interlocking means for securing the top element to the neck, the method comprising applying hot melt material in a flowable molten state to the neck, applying the top element to the neck while the hot melt material is still in a flowable state, and mechanically securing the top element to the neck utilizing the cooperating mechanical interlocking means upon relative rotation between the neck and the top element, whereby the hot melt material is spread about the neck to form when solidified a seal between the neck and the top element.

In accordance with another embodiment of the present invention there is disclosed a method of applying a top element to the neck of a container to provide a seal therebetween, the top element and the neck having cooperating engageable threads, the method comprising applying hot melt material in a flowable molten state to the neck at a plurality of circumferential locations, rotating the top element, applying the rotating top element to the neck while the hot melt material is still in a flowable state to mechanically secure the top element to the neck utilizing the cooperating engageable threads, and spreading the hot melt material circumferentially about the neck and the cooperating engageable threads while applying the top element to form when solidified a seal between the neck and the top element.

BRIEF DESCRIPTION OF THE DRAWINGS

The above description, as well as further objects, features and advantages of the present invention will be more fully understood with reference to the following detailed description of a process of sealing a top element to a container using hot melt material, when taken in conjunction with the accompanying drawings, wherein:

FIG. 3 is a top plan view of the operative relationship of a pair of spaced nozzle assemblies for application of hot melt material to a plurality of circumferentially spaced locations on the container neck in accordance with one embodiment of the present invention;

FIG. 4 is a partial front elevational view showing globs of hot melt material having been applied to circumferentially spaced locations on a threaded container neck; and FIG. 5 is a top plan view of the operative relationship of a pair of spaced nozzle assemblies for application of hot melt material to a plurality of circumferentially spaced locations on the container neck in accordance with the preferred embodiment of the present invention.

DETAILED DESCRIPTION

Figure 1:
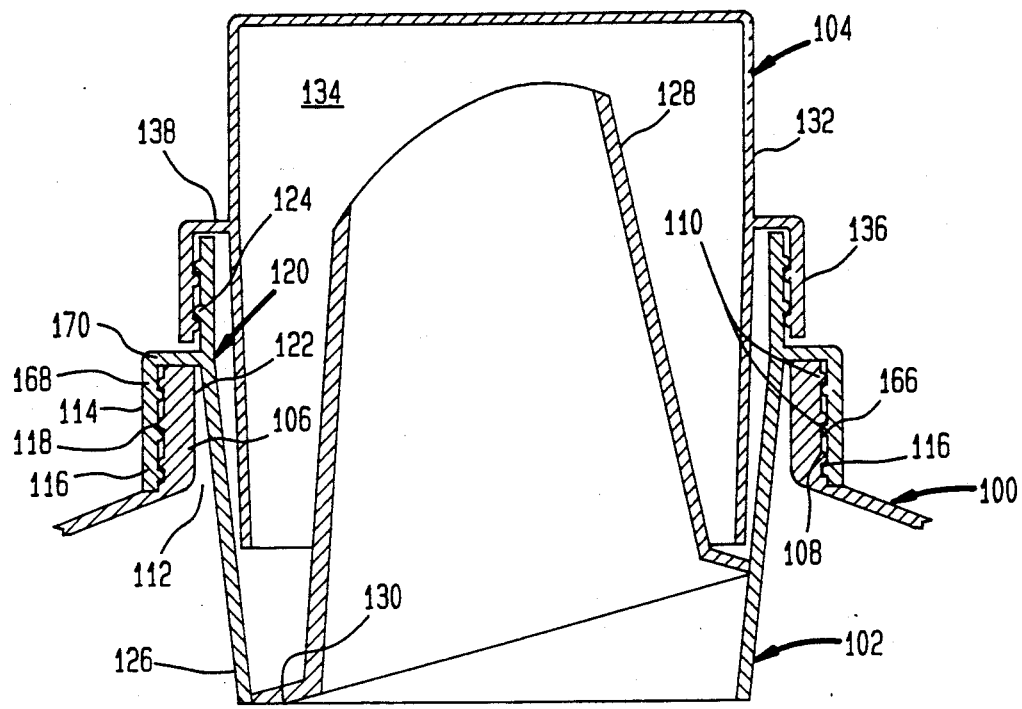
FIG. 1 is a cross-sectional view taken along line 1—1 in FIG. 2 showing a container having a top element sealed to the container neck by means of hot melt material.

Referring now to the drawings wherein like reference numbers represent like elements, there is shown in FIG. 1 a portion of a container 100 preferably constructed from plastic material by blow molding or the like. The container 100 may be constructed into a variety of shapes and sizes as desired for storing a variety of material contents. Although preferably the contents will be in liquid form, it is contemplated that powder material may also be received within the container 100 for dispensing therefrom. The container 100 incorporates a top element 102 in the nature of a dripless pour spout and a measuring cup 104 which also functions as a closure for the container by being securable to the top element as to be described hereinafter.

The container 100 has an upwardly extending neck 106 which circumferentially supports on its exterior surface 108 a continuous spiral thread 110. The thread 110 and container neck 106 are integrally formed with the container 100 during blow molding. The container neck 106 defines a control container opening 112 for discharge of the contents of the container 100 through the top element 102 as to be briefly described hereinafter.

The top element 102 includes a collar 114 having an interior surface 116 supporting a continuous spiral thread 118 constructed to be engageable with spiral thread 110 of container neck 106. The collar 114 extends outwardly from and circumferentially surrounds a top element wall 120 to form an annular cavity 122 therebetween. The top element wall 120 is divided into an upwardly extending externally threaded wall 124 and a downwardly extending unthreaded lower wall 126. The lower wall 126 is dimensioned to extend through opening 112 of the container 100 and internally supports an upwardly extending dripless pour spout 128. The pour spout 128 is provided with an opening 130 to enable return of residual liquid to the container 100, as well as enabling return of unused liquid from the measuring cup 104. When the top element 102 is secured to the container 100, the pour spout 128 extends outwardly beyond the extent of the container neck 106 to enable pouring of the liquid contents from the container in a known manner.

The measuring cup 104 includes an enclosed cylindrical wall 132 which provides a hollow interior 134 for measuring the contents of the container 100 to be dispensed. The cylindrical wall 132 supports an outwardly extending circumferentially arranged internally threaded collar 136. The collar 136 in conjunction with cylindrical wall 132 define an annular opening 138 for receiving the externally threaded upper wall 124 of the top element 102. This construction enables the measuring cup 104 to be threadingly secured in sealed arrangement to the top element 102 as depicted in FIG. 1. It is to be understood that the releasably securing of the measuring cup 104 to the top element 102 forms no part of the present invention and will accordingly not be described further.

Figure 2:
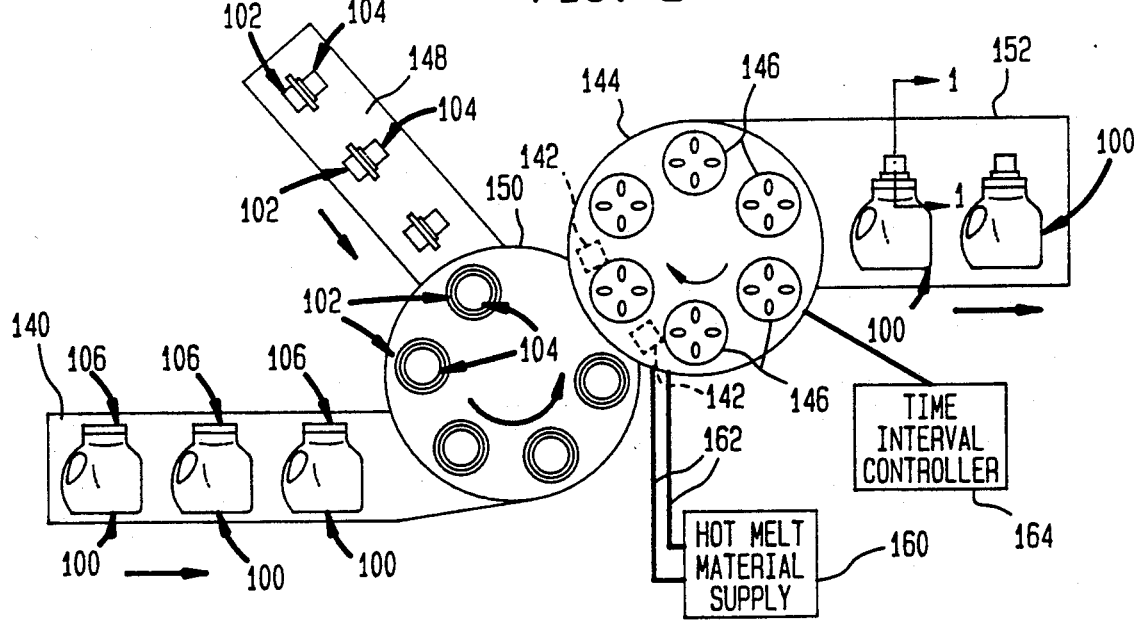
FIG. 2 is a diagrammatic illustration showing an assembly line for the application of a top element to the container neck using hot melt material.

Referring now to FIG. 2, there is disclosed a production assembly line for the assembly of containers having a top element 102 sealed thereto by means of hot melt material in accordance with the process of the present invention. Containers 100 having a threaded neck 106 are supplied by means of a conveyor 140 to one or more hot melt material application stations generally indicated by the rectangular boxes in dashed lines and designated by reference numeral 142. Overlying the hot melt material application station 142 is a rotatable turret 144 in the nature of a conventional capping machine, such as available from Serac, to which there is circumferentially arranged a plurality of rotatable grabbers 146. The grabbers 146 are designed to receive a top element 102 and measuring cup 104 in assembled relationship, and to apply same to the container neck 106 of an underlying container 100 by rotation thereof to effect cooperative threaded engagement. A continuous supply of assembled top elements 102 and measuring cups 104 initially are provided by a conveyor 148 and finally by a circular conveyor 150. The circular conveyor 150 advances the assembled top elements 102 and measuring cups 104 to the individual grabbers 146 to be applied to the advancing containers 100 at the hot melt material application stations 142. Assembled containers 100 are conveyed away from the turret 144 by means of conveyor 152. Although the production assembly line as shown in FIG. 2 has been described with respect to particular components and their particular arrangement, it is to be understood that other components and arrangements may be utilized in conjunction with the process of sealing a top element 102 to a container 100 using hot melt material in accordance with the present invention as now to be described.

Referring specifically to FIG. 3 where there is shown one embodiment of the present invention, the container 100 is advanced to the hot melt material application stations 142 where there is provided a pair of opposing nozzle assemblies 154 for application of hot melt material. Each nozzle assembly 154 supports a pair of spaced apart nozzles 156 through which the hot melt material is discharged. The nozzles 156 are arranged in pairs on opposite sides of the container neck 106. Each pair of nozzles 156 are arranged spaced apart in the range of about 40 to 75 degrees from the center of opening 112 of the container 100, and preferably about 45 degrees. In turn, the nozzles 156 are spaced from the container neck 106 a distance of about six to nine inches, the distance shown in FIG. 3 not being to scale. This arrangement results in the application of four globs 158 of hot melt material onto the exterior surface 108 of container neck 106 as further shown in FIG. 4. The hot melt material is supplied to the nozzles 156 from a heated hot melt material pot 160 through a pair of heated hose assemblies 162. The nozzle assemblies 154, nozzles 156, hot melt material pot 160 and heated hose assemblies 162 are commercially available from Nordson.

The container 100 is advanced between the nozzle assemblies 154 having the exterior surface 108 of the container neck 106 opposing the nozzles 156. At this position, the container neck 106 is also arranged directly underlying a grabber 146 which has received an assembled top element 102 and measuring cup 104 which is being rotated in a thread engaging direction. A plurality of globs 158 of hot melt material in a flowable molten form are squirted from the nozzles 156 onto the exterior surface 108 of the container neck 106 at corresponding spaced apart locations as the container 100 is moved past the nozzles at a line speed of about 60 feet per minute. While the globs 158 of hot melt material are still in a flowable form, the overlying grabber 146 applies the rotating assembled top element 102 and measuring cup 104 to the container neck 106. The time interval between the application of the globs 158 of hot melt material and applying of the assembled top element 102 and measuring cup 104 by the grabbers 146 is in the order of one-half to one second.

The time interval for squirting the hot melt material from the nozzles 156 is controlled by a time interval controller 164 as shown in FIG. 2 which is also available from Nordson. In this regard, the size, shape and number of globs 158 of hot melt material can be controlled to achieve the desired seal. For example, a short duration will result in the discharge of globs 158 of hot melt material in the nature of balls. On the other hand, a longer duration will result in the discharge of globs 158 of hot melt material having an elongated cylindrical shape. It is also possible to discharge multiple globs 158 of hot melt material from each nozzle 156 if desired.

As the top element 102 is rotatably applied to the container neck 106, threads 118 of collar 114 cooperatively engage threads 110 as the container neck is received within annular cavity 122. As a result of this threaded engagement from relative rotation between the top element 102 and container neck 106, the plurality of globs 158 of hot melt material are uniformly spread spirally downward therebetween to form a continuous hot melt material seal 166. Due to the rotation of the top element 102, it is contemplated that each glob 158 of hot melt material is spread between collar 114 and container neck 106 in a distributed range in the range of about 410 to 450 degrees. As the hot melt material forming the seal 166 solidifies relatively quickly, there is formed an effective liquid seal between the top element 102 and container neck 106 enabling immediate shipment of filled containers 100.

Although a number of hot melt materials are suitable for use in sealing the top element 102 to the container neck 106, a preferred hot melt material is available from United Resin Products, Product No. 808079. The hot melt material is a low viscosity pressure sensitive labeling hot melt adhesive having excellent tack, flexibility and machine properties while maintaining strength and adhesion. The normal application temperature for this hot melt adhesive is in the range of about 150° to 175° C.

Referring to FIG. 5, there is shown the construction and arrangement of the nozzle assemblies 154 in accordance with a preferred embodiment of the present invention. Each nozzle assembly 154 includes a single nozzle 156 arranged circumferentially about container neck 106 spaced approximately 180° apart. The nozzles 156 are spaced from the container neck 106 a distance of about 1 ⅜ to 1 ⅝ inches, the distance shown in FIG. 5 not being to scale. The distance minimizes precooling and/or solidification of the hot melt material. As the container 100 is advanced past the nozzle assemblies 154 at the previously noted rate, a single glob 158 of hot melt material from each of the nozzles 156 is squirted onto the container neck 106. Each glob 156 is preferably in the shape of a cylinder having a length in the range of about three-quarters to one inch and a diameter in the range of about one-sixteenth to one-eighth inch. Due to the movement of the container 100, the globs 158 of hot melt material are somewhat smeared onto the exterior surface 108 of the container neck 106 at the corresponding spaced apart locations. That is, the globs 158 of hot melt material are essentially oriented such that their longitudinal axis is in alignment with the direction of movement of the container 100. While the globs 158 of hot melt material are still in a flowable form, the overlying grabber 146 applies the rotating assembled top element 102 and measuring cup 104 to the container neck 106 as previously described with respect to the embodiment illustrated in FIG. 3.

As shown in FIG. 1, the container neck 106 terminates at a generally planar surface 168 which is brought into engagement with a generally planar end wall 170 of collar 114, the extent of which defines the upper width of annular cavity 122. The engagement of end wall 170 with surface 168 provides a liquid seal thereat, as well as limiting the extent of the threaded engagement of the top element 102 with the container neck 106. The seal may be enhanced by providing the end wall 170 with one or more projecting integral sealing rings (not shown) which will slightly deform. The seal is effective to prevent fluid communication between the interior of the container 100 and the hot melt material seal 166 thereby preventing contamination of the container contents or attack on the hot melt material seal. As the globs 158 of the hot melt material are applied to the exterior surface 108 of the container neck 106, and as the top element 102 is applied in a rotating direction away from the planar surface 168, the hot melt material is prevented from being spread onto the planar surface or onto the end wall 170. As a result, the seal created between the planar surface 168 and end wall 170 is substantially free of any hot melt material.

Although the invention herein has been described with reference to particular embodiments, it is to be understood that these embodiments are merely illustrative of the principles and application of the present invention. For example, the nozzles 156 may be arranged at other circumferential locations around the container neck 106 other than those described with respect to FIGS. 3 and 4. It is therefore to be understood that numerous modifications may be made in the illustrative embodiments and that other arrangements may be devised without departing from the spirit and scope of the present invention as defined by the appended claims.

What is claimed is:

1. A method of applying a top element having an interior surface and an annular end wall to the neck of a container to provide a seal therebetween, said neck having a top surface and spaced apart interior and exterior surfaces, said interior surface of said top element and said exterior surface of said neck having cooperating mechanical interlocking means for securing said top element to said neck, said method comprising applying hot melt material in a flowable molten state solely to said exterior surface of said neck while said top surface of said neck and said interior surface and said annular end wall of said top element remains free of said hot melt material, applying said top element having said interior surface and said annular end wall thereof free of said hot melt material about said exterior surface of said neck while said hot melt material is still in a flowable state, mechanically securing said top element to said neck utilizing said cooperating mechanical interlocking means upon relative rotation between said neck and said top element, said hot melt material being applied in a sufficient quantity such that said hot melt material is spread solely about said exterior surface of said neck and said cooperating mechanical interlocking means while said interior surface and said top surface of said neck and said annular end wall of said top element remain free of said hot melt material to form when solidified a seal between said exterior surface of said neck and said interior surface of said top element, and engaging said annular end wall of said top element directly against said top surface of said neck in the absence of said hot melt adhesive therebetween.

2. The method of claim 1, wherein said mechanical interlocking means comprises an externally threaded portion of said neck and an internally threaded portion of said top element.

3. The method of claim 1, wherein said hot melt material is applied to said neck on at least a portion of said mechanical interlocking means.

4. The method of claim 1, wherein said hot melt material is applied at a plurality of spaced locations on said neck.

5. The method of claim 4, wherein said spaced locations are arranged in the range of about 40 to 75 degrees from each other.

6. The method of claim 4, wherein said spaced locations are arranged about 180 degrees from each other.

7. The method of claim 6, wherein said hot melt material is discharged through nozzles spaced in the range of about 1 ⅜ to 1 ⅝ inches from said neck.

8. The method of claim 1, wherein said top element is rotated while being applied to said neck to provide said relative rotation therebetween.

9. The method of claim 8, wherein said top element is rotated sufficiently to cause said hot melt material to spread along an effective spiral path in the range of about 410 to 450 degrees about said neck.

10. The method of claim 1, wherein said relative rotation between said top element and said neck causes said hot melt material to be spread over said mechanical interlocking means.

11. The method of claim 1, wherein said hot melt material is applied in the form of a glob to said neck.

12. The method of claim 1, wherein said hot melt material is applied to said neck at a temperature in the range of about 150° to 175° C.

13. The method of claim 1, wherein said hot melt material is applied in the form of a cylinder in the range of about ¾ to 1 inch in length and in the range of about 1/16 to ⅛ inch in diameter.

14. The method of claim 1, wherein said hot melt material is applied to said neck while said container is moving.

15. A method of applying a top element having an interior surface and an annular end wall to the neck of a container to provide a seal therebetween, said neck having a top surface and spaced apart interior and exterior surfaces, said top element on said interior surface and said neck on said exterior surface having cooperating engageable threads, said method comprising applying hot melt material in a flowable molten state solely to said exterior surface of said neck at a plurality of circumferential locations while said top surface of said neck and said interior surface and said annular end wall of said top element remains free of said hot melt material, rotating said top element, applying the rotating top element having said interior surface and said annular end wall thereof free of said hot melt material about said exterior surface of said neck while said hot melt material is still in a flowable state to mechanically secure said top element to said neck utilizing said cooperating engageable threads, applying said hot melt material in a sufficient quantity such that said hot melt material is spread circumferentially solely about said exterior surface of said neck and said cooperating engageable threads while applying said top element such that said interior surface and said top surface and said annular end wall of said top element remains free of said hot melt material to form when solidified a seal between said exterior surface of said neck and said interior surface of said top element, and engaging said annular end wall of said top element directly against said top surface of said neck in the absence of said hot melt adhesive therebetween.

16. The method of claim 15, wherein said hot melt material is applied at circumferentially opposing locations on said neck.

17. The method of claim 16, wherein said circumferentially opposing locations each include a pair of spaced locations arranged in the range of about 40 to 75 degrees from each other.

18. The method of claim 16, wherein said hot melt material is discharged through nozzles spaced in the range of about 1 ⅜ to 1 ⅝ inches from said neck.

19. The method of claim 15, wherein said top element is rotated sufficiently to cause said hot melt material to spread along an effective spiral path in the range of about 410 to 450 degrees about said neck.

20. The method of claim 15, wherein said hot melt material is applied in the form of a glob to said neck.

21. The method of claim 15, wherein said hot melt material is applied in the form of a cylinder in the range of about ¾ to 1 inch in length and in the range of about 1/16 to ⅛ inch in diameter.

22. The method of claim 15, wherein said hot melt material is applied to said neck while said container is moving.

23. The method of claim 15, wherein said hot melt material is applied to said neck at a temperature in the range of about 150° to 175° C.

* * * * *